United States Patent [19]

Yoshikawa et al.

[11] Patent Number: 4,534,932

[45] Date of Patent: Aug. 13, 1985

[54] APPARATUS FOR REMOVING CLADDING MATERIAL FROM BOTTOM PORTION OF CONTROL ROD GUIDE TUBE OF NUCLEAR REACTOR

[75] Inventors: Kazuaki Yoshikawa; Yuichi Matsumura; Noriaki Mase, all of Hitachi, Japan

[73] Assignees: Hitachi, Ltd; Hitachi Service Engineering Co., Ltd., both of Tokyo, Japan

[21] Appl. No.: 616,404

[22] Filed: Jun. 1, 1984

[30] Foreign Application Priority Data

Jun. 3, 1983 [JP] Japan .................................. 58-97871

[51] Int. Cl.³ ............................................ G21C 19/42
[52] U.S. Cl. ..................... 376/310; 376/316; 376/353; 15/320
[58] Field of Search ............... 376/249, 250, 310, 316, 376/353; 15/320; 134/198; 29/81 B, 81 H

[56] References Cited

U.S. PATENT DOCUMENTS

| 4,079,701 | 3/1978 | Hickman et al. | 122/382 |
| 4,272,017 | 6/1981 | Franz | 239/1 |
| 4,456,440 | 6/1984 | Korner | 417/540 |
| 4,461,650 | 7/1984 | Ozawa | 376/310 X |
| 4,470,952 | 9/1984 | Vassalotti | 376/310 X |

FOREIGN PATENT DOCUMENTS

| 2058766 | 5/1972 | Fed. Rep. of Germany | 376/310 |
| 51399 | 5/1978 | Japan | 376/310 |
| 151791 | 11/1979 | Japan | 376/310 |

OTHER PUBLICATIONS

Knox, Nuclear Eng'g-Int., *Decontamination Cuts Costs,* Jan. '83, pp. 26-28.

*Primary Examiner*—Peter A. Nelson
*Attorney, Agent, or Firm*—Antonelli, Terry & Wands

[57] ABSTRACT

A device for removing a cladding material from a bottom portion of a control rod guide tube of a nuclear reactor. A rotor tube is removably mounted in a housing of a control rod drive of the nuclear reactor and has at least its forward end portion hydraulically insertable into the bottom portion of the control rod guide tube through an opening located in a lower portion of the control rod guide tube for inserting the control rod drive. The rotor tube is provided at the forward end portion thereof with a foldable rotary brush and cleaning water supply nozzles. A rotary drive shaft is extending through the rotor tube for rotating the rotary brush. The cladding material deposited on the bottom portion of the control rod guide tube that has become radioactive can be readily and positively removed therefrom with a small volume of water while enabling the risk of exposure to radiation to be minimized at a time the operation of cleaning the bottom portion of the control rod guide tube is performed.

7 Claims, 4 Drawing Figures

APPARATUS FOR REMOVING CLADDING MATERIAL FROM BOTTOM PORTION OF CONTROL ROD GUIDE TUBE OF NUCLEAR REACTOR

BACKGROUND OF THE INVENTION

This invention relates to an apparatus for removing a cladding material from the bottom portion of a control rod guide tube of a nuclear reactor.

Means for removing from a control rod guide tube (hereinafter CR guide tube) of a nuclear reactor a cladding material deposited thereon that have hitherto been proposed generally comprise an underwater pump in the form of a cleaning machine equipped with a filter for removing from the bottom portion of the CR guide tube such cladding material as has become radioactive at the time of a regular inspection, to facilitate the flow of a coolant through a reactor core. Difficulties have been experienced, however, in satisfactorily removing the cladding material deposited on the bottom portion of the CR guide tube located in a position which is about 20 meters deep in the water from the liquid level by such means, and such means have proved to have substantially no effect in removing the cladding material adhering to the surface of the bottom portion of the CR guide tube. Moreover, since a large volume of water is required for performing the operation of removing the cladding material by the aforesaid means, it is time-consuming and troublesome to subject the radioactive waste that has been recovered to a suitable treatment, and a cladding material deposited on the bottom portion of the CR guide tube cannot be effectively stripped by a stream of water usually used for such purpose. Thus, the time required for performing the cleaning operation is prolonged, resulting in an increase in exposure to radiation.

SUMMARY OF THE INVENTION

This invention has been developed for the purpose of obviating the aforesaid disadvantages of the prior art. Accordingly, the invention has as its object the provision of an apparatus for removing a cladding material from the bottom portion of a CR guide tube of a nuclear reactor which enables the cladding material deposited on the bottom portion of the CR guide tube to be removed with a high degree of efficiency.

The outstanding characteristics of the invention allowing the aforesaid object to be accomplished are that the apparatus for removing the cladding material from the bottom portion of the CR guide tube comprises a rotor tube removably mounted in a housing of a control rod drive of a nuclear reactor and having at least a forward end portion hydraulically insertable into the bottom portion of the CR guide tube through an opening located in a lower portion of the control rod guide tube for inserting the control rod drive, and said rotor tube having a foldable rotary brush and cleaning water supply nozzles provided at the forward end portion thereof, and a rotary drive shaft extending through the rotor tube for rotating the rotary brush.

DESCRIPTION OF THE PREFERRED EMBODIMENT

The preferred embodiment of the invention will now be described by referring to the accompanying drawings.

Figure 1:
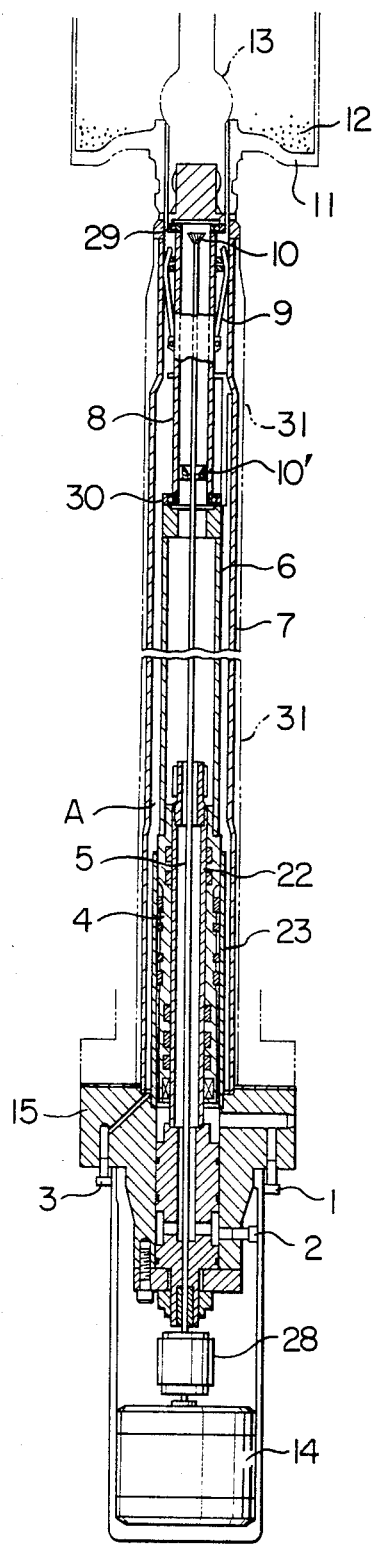
FIG. 1 is a view showing the apparatus for removing a cladding material from the bottom portion of a CR guide tube of a nuclear reactor according to the invention as mounted in the housing of a control rod drive (hereinafter CRD)

FIG. 1 shows the cladding material removing apparatus which is mounted in a housing of a CRD located in a lower portion of a pressure vessel of a nuclear reactor. The cladding material removing apparatus is in a multiple structure comprising a cylinder tube 23 joined by welding to a flange 15, a piston guide tube 22 connected to the flange 15, and a drive piston 4 interposed between the cylinder tube 23 and piston guide tube 22 for being hydraulically driven to move upwardly. Located outside the cylinder tube 23 is an outer tube 7 defining a passageway A through which cleaning water is discharged. As a hydraulic fluid is introduced through a hydraulic drive fluid inlet port 1, the drive piston 4 as well as a drive tube 6, a rotor tube 8 and a control rod (hereinafter CR) 13 are caused to move upwardly as a unit. The reference numeral 31 designates an inner wall of the CRD housing.

Figure 2:
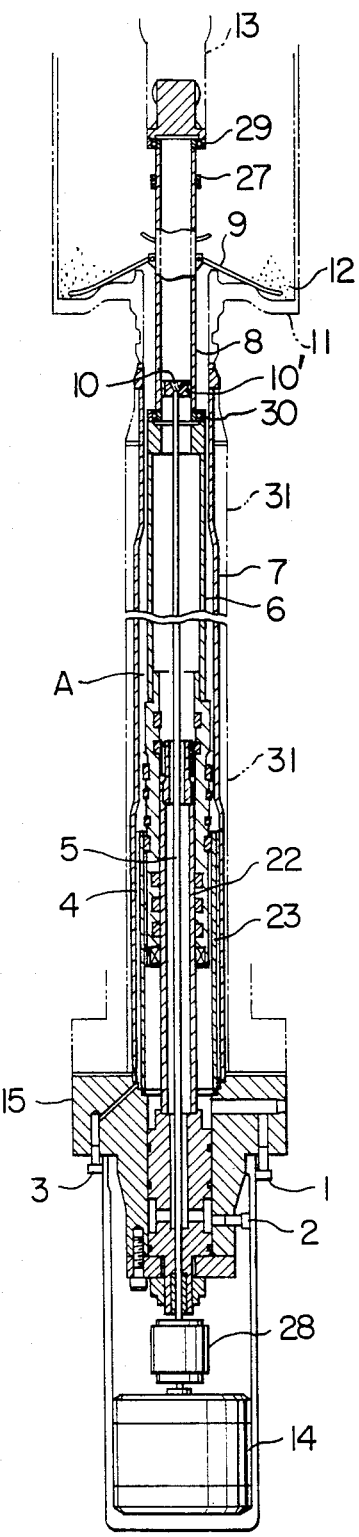
FIG. 2 is a view showing the apparatus for removing a cladding material from the bottom portion of a CR guide tube shown in FIG. 1 in condition for operation.

FIG. 2 shows the cladding material removing apparatus driven by the hydraulic fluid to move the CR 13 to an elevated position. When the apparatus is in this position, a rotary brush 9 supported on the rotor tube 8 is brought to an open position by its own weight or by the aid of biasing force of a spring, not shown, as shown in the figure. As a drive shaft 5 is rotated either manually or by means of a motor 14 to bring a gear 10 into meshing engagement with a gear 10' supported on the rotor tube 8, the rotation is transmitted to the rotary brush 9 to cause same to rotate. When the motor 14 is actuated to rotate the shaft 5, a floating movement of the brush 9 which is formed of metal and has its own weight can be avoided by reducing the speed of the motor 14 to a satisfactory level by means of a reducing gearing 28. As the cleaning water is supplied through a cleaning water inlet port 2, it flows through the drive tube 6 and rotor tube 8 and is ejected through nozzles 27 toward a CR guide tube lower portion 11.

Figure 3:
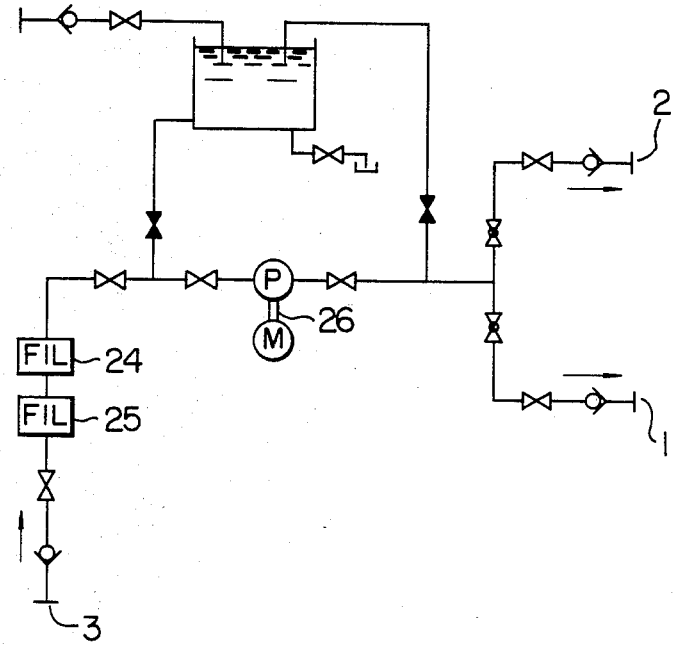
FIG. 3 is a diagram of the waterfeed unit according to the invention.

FIG. 3 shows in a systematic view a feedwater unit of the cladding material removing apparatus according to the invention. The feedwater unit is connected to the cladding material removing apparatus through high pressure hoses for handling the cleaning water and hydraulic drive fluid as well as water that is discharged from the apparatus. The drive fluid pressurized by a pump 26 is fed to the drive fluid inlet port 1 through a pressure reducing valve to move the drive piston 4 upwardly and move the rotary brush 9 into the CR guide tube lower portion 11. Then, the CR 13 is moved upwardly to cause a reactor water or coolant remaining in the CR guide tube lower portion 11 to flow therefrom through the passage A between the drive tube 6 and outer tube 7 and pass through a cleaning water outlet port 3 into the feedwater unit, where the coolant is caused to flow through filters 24 and 25 and is pressurized by the pump 26 to be passed through the pressure reducing valve, before being introduced into the cladding material removing apparatus through the cleaning water inlet port 2. Rotation of the brush 9 throws upwardly a cladding material 12 of high radioactivity and allows same to be carried by the cleaning water from the nozzles 27 to the feedwater unit, so that the cladding material 12 in the CR guide tube lower portion 11 can be readily removed therefrom to clean the lower portion 11.

If the cleaning water supplied through the nozzles 27 is high in pressure, the cladding material 12 would be blown upwardly to an upper portion of the CR guide tube. Thus, to avoid this phenomenon, the pressure of the cleaning water supplied to the CR guide tube lower portion 11 is kept at a level slightly higher than the head of the CR guide tube lower portion 11.

By using the cladding material removing apparatus according to the invention, it is possible to remove the cladding material 12 from the CR guide tube lower portion 11 without releasing the cleaning water of high radioactivity to outside. Additionally, in the feedwater unit associated with the cladding material removing apparatus according to the invention, the cleaning water introduced through the cleaning water outlet port 3 into the feedwater unit flows through the filters 24 and 25 of a cartridge type, so that the invention offers the advantage that treatment of the removed cladding material is facilitated.

Figure 4:
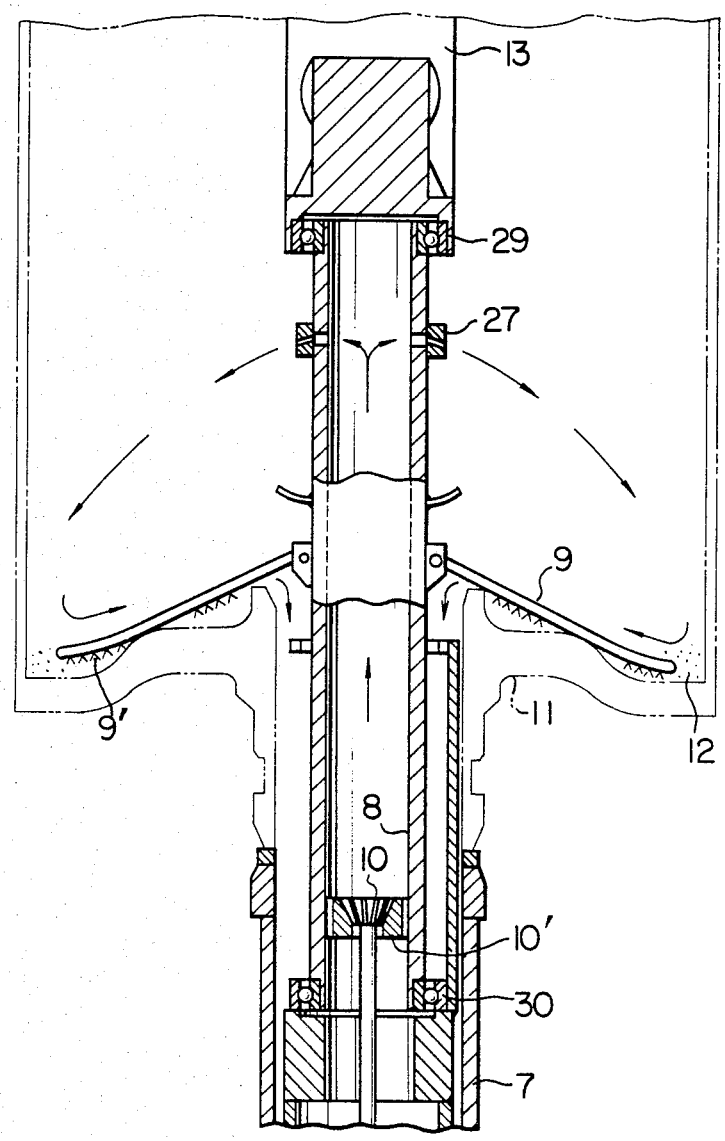
FIG. 4 is a detailed view of the rotor section of the apparatus for removing a cladding material from the bottom portion of a CR guide tube shown in FIG. 1.

FIG. 4 shows in detail the rotor tube 8. The rotor tube 8 is journalled at opposite ends thereof by bearings 29 and 30, so that the rotor tube 8 supporting the brush 9 is driven for rotation as a unit by the torque of the drive shaft 5. The brush 9 has attached thereto wires 9' formed of plastic or metal for sweeping the CR guide tube lower portion 11 to remove the cladding material 12 therefrom. The flow of the cleaning water is indicated by arrows in FIG. 4. Although the CR guide tube lower portion 11 is usually filled with the coolant at the time of a regular inspection of the nuclear reactor, the coolant is not pressurized and therefore the pressure in the range between 8 and 10 kg/cm$^2$ is enough for the hydraulic drive fluid to allow the cladding material removing apparatus according to the invention to operate satisfactorily, and the pressure of the cleaning water is usually in the range between 3 and 4 kg/cm$^2$.

At the time of a regular inspection of the nuclear reactor, the CRD is detached from the lower portion of the nuclear reactor by a CRD automatic replacing apparatus and disassembled in a CRD repair chamber for inspection. The cladding material removing apparatus according to the invention is substantially similar in configuration to the CRD, so that it can be readily attached and detached by using the CRD automatic replacing apparatus. This is conductive to a shortening of the time required for performing a cladding material removing operation.

In the cladding material removing apparatus according to the invention, the position and size of the drive fluid inlet port 1 are similar to those of a drive fluid inlet port of the CRD, so that the drive fluid for moving upwardly the CR 13 and drive tube 6 can be supplied from a hydraulic fluid control unit (HCU) of a CRD system. This eliminates the need to relay on a feedwater system provided outside, thereby enabling a compact size to be obtained in a cladding material removing apparatus. Thus, the invention allows operability to be improved and exposure to radiation to be reduced by utilizing the HCU of the CRD system which already exists.

A seal and other parts associated with the drive piston 4 of the cladding material removing apparatus according to the invention which are expendable are shared by the CRD system, and this facilitates maintenance. The piston guide tube 22 of the cladding material removing apparatus according to the invention is bolted to the flange 15 to allow the guide tube 22 to be withdrawn when inspection and replacement of the parts are carried out. This also facilitates maintenance.

The cladding material removing apparatus of the aforesaid construction and operation according to the invention achieves the following effects.

The invention enables a protection from a cladding material to be provided to the CRD by quickly and positively removing the cladding material from the bottom portion of the CR guide tube. Since the cleaning operation can be finished in a short period of time, exposure to radiation during the cleaning operation can be minimized.

The apparatus itself comprises the rotary tube having at the forward end portion the rotary brush for removing the cladding material from the bottom portion of the CR guide tube, and a flange assembly with poston guide tube and cylinder tube, and this facilitates handling and enables operation to be performed by remote control.

Moreover, the arrangement whereby the drive fluid supplied from the HCU of the CRD system by a pump is made to flow in circulation through the cladding material removing apparatus to remove the cladding material from the cleaning water by the filters allows cleaning of the bottom portion of the CR guide tube to be performed without leaking the contaminated water to outside. The filters can be readily replaced, and the cleaning operation can be performed in a short period of time. Thus, the cladding material can be readily and positively removed from the bottom portion of the CR guide tube while regular disassembling and inspection of the CRD are being performed.

What is claimed is:

1. An apparatus for removing a cladding material from a bottom portion of a control rod guide tube of a nuclear reactor, comprising:
   a rotor tube removably mounted in a housing of a control rod drive of the nuclear reactor and having at least at a forward end portion hydraulically insertable into the bottom portion of the control rod guide tube through an opening located in a lower portion of the control rod guide tube for inserting the control rod drive, said rotor tube having a foldable rotary brush and cleaning water supply nozzles provided at the forward end portion thereof; and
   a rotary drive shaft extending through the rotor tube for rotating the rotary brush.

2. An apparatus for removing a cladding material from a bottom portion of a control rod guide tube of a nuclear reactor as claimed in claim 1, wherein said rotary brush is adapted to open by its own weight.

3. An apparatus for removing a cladding material from a bottom portion of a control rod guide tube of a nuclear reactor as claimed in claim 1, wherein said rotary brush is selected from the group consisting of a brush formed of a synthetic resinous material and a brush formed of metal.

4. An apparatus for removing a cladding material from a bottom portion of a control rod guide tube of a nuclear reactor comprising:
   (a) a rotor tube having a foldable rotary brush mounted at its outer side, cleaning water supply nozzles located at its forward end portion, and a rotary drive shaft extending through its interior;
   (b) a drive tube constituting an entity separate from said rotor tube and located at a lower end of said rotor tube for vertically moving the rotor tube, said drive tube having said rotary drive shaft extending through its interior;
   (c) a drive piston unitary with said drive tube located at a lower end of said drive tube;
   (d) a cylinder tube enclosing said drive piston for vertically moving the drive piston by supplying thereto and discharging therefrom a hydraulic drive fluid; and
   (e) an outer tube generally enclosing said cylinder tube and drive tube and defining therebetween a passage for discharging therethrough a cleaning water from the control rod guide tube.

5. An apparatus for removing a cladding material from a bottom portion of a control rod guide tube of a nuclear reactor as claimed in claim 4, wherein said rotary brush is adapted to open by its own weight.

6. An apparatus for removing a cladding material from a bottom portion of a control rod guide tube of a nuclear reactor as claimed in claim 4, wherein said rotary brush is selected from the group consisting of a brush formed of a synthetic resinous material and a brush formed of metal.

7. An apparatus for removing a cladding material from a bottom portion of a control rod guide tube of a nuclear reactor as claimed in claim 4, wherein said hydraulic drive fluid for moving said drive piston is supplied from a hydraulic pressure control unit for the control rod drive.

* * * * *